United States Patent [19]
Smitherman et al.

[11] Patent Number: 5,879,082
[45] Date of Patent: Mar. 9, 1999

[54] DUAL ELEMENT TEMPERATURE SENSING PROBE USING A MATHEMATICAL MODEL OF HEAT TRANSFER ALONG THE PROBE AND METHOD THEREFOR

[75] Inventors: John P. Smitherman, Salinas; John G. Olin, Carmel Valley, both of Calif.

[73] Assignee: Sierra Instruments, Inc., Monterey, Calif.

[21] Appl. No.: 806,220

[22] Filed: Feb. 25, 1997

[51] Int. Cl.⁶ .................................................. H01L 7/02
[52] U.S. Cl. .......................... 374/110; 374/134; 374/148
[58] Field of Search ............................ 374/110, 114, 374/116, 134, 148

[56] References Cited

U.S. PATENT DOCUMENTS

| | | | |
|---|---|---|---|
| 2,660,883 | 12/1953 | Wyczalek | 374/144 |
| 3,100,985 | 8/1963 | Wells | 374/110 |
| 3,596,518 | 8/1971 | Kirkpatrick | 374/134 |
| 4,183,248 | 1/1980 | West | 374/134 |
| 4,423,967 | 1/1984 | Mouton | 374/144 |
| 4,723,066 | 2/1988 | Kurokawa et al. | 374/114 |
| 5,046,858 | 9/1991 | Tucker | 374/110 |
| 5,285,673 | 2/1994 | Drexel et al. | 73/204.27 |
| 5,318,363 | 6/1994 | Mauric | 374/142 |

FOREIGN PATENT DOCUMENTS

| | | | |
|---|---|---|---|
| 3048361 | 7/1982 | Germany | 374/134 |
| 53-144786 | 12/1978 | Japan | 374/134 |
| 554474 | 4/1977 | U.S.S.R. | 374/134 |
| 739694 | 11/1955 | United Kingdom | 374/148 |
| 2266771 | 11/1993 | United Kingdom | 374/134 |

*Primary Examiner*—Ronald Biegel
*Assistant Examiner*—Paul D. Amrozowicz
*Attorney, Agent, or Firm*—LaRiviere, Grubman & Payne, LLP

[57] ABSTRACT

An elongate temperature probe is provided for extending into a fluid flow. First an second temperature sensors are mounted in the temperature probe, spaced apart from each other along the length of the probe. The first and second temperature sensors provide temperature signals to a data processor. The data processor in use determines the temperature of the fluid flow from the temperature signals and at least one other fluid parameter, using a mathematical model of the heat transfer along the probe.

39 Claims, 3 Drawing Sheets

DUAL ELEMENT TEMPERATURE SENSING PROBE USING A MATHEMATICAL MODEL OF HEAT TRANSFER ALONG THE PROBE AND METHOD THEREFOR

TECHNICAL FIELD

This invention relates to an improved method and apparatus for measuring the temperature of flows.

BACKGROUND OF THE INVENTION

The temperature of a gas or liquid flow is important in industry for a number of reasons. For example, in a chemical processing plant requiring reagents to be at or above a particular temperature, errors in measuring the temperature of the reagent flows can result in the consumption of additional heat, or in unsatisfactory reagent processing.

Also, some flowmeters require a measurement of the temperature of a fluid flow to calculate a mass flow rate from the quantity measured by the flowmeter, e.g. the velocity of the flow. An error in the temperature measurement will result in a corresponding error in the final output of the flowmeter.

A temperature sensing apparatus, and a related method of measuring the temperature of a fluid flow, which reduces inaccuracies inherent in previous temperature sensors would provide improved reagent processing and flowrate measurements.

SUMMARY OF THE INVENTION

The method and apparatus of the invention provides a means whereby inaccuracies in the measurement of the temperature of fluid flows can be reduced. In this regard, it should be noted that the term "fluid" includes liquids and gases. In a single element temperature sensor positioned in a fluid flow, the observed temperature is rarely equal to the actual temperature of the fluid flow. One reason for this is that, if the substrate to which the temperature sensor is mounted is at a different temperature from the fluid flow, heat will flow from the substrate to the temperature sensor, causing errors in the observed temperature.

This effect is always present, unless the fluid is flowing so rapidly that it imposes its temperature completely on the sensor, or unless all the temperatures in the system are equal.

According to the invention, this effect is taken into account by measuring the temperature at two points on an elongate body projecting into the fluid flow, and calculating the actual temperature of the fluid flow, using mathematical models of the heat transfer along the element. That is, the errors caused by temperature differences in the system are reduced by quantifying and then adjusting for the effects of such temperature differences.

More particularly, according to the invention there is provided a method of determining the temperature of a fluid flow in a conduit, comprising the steps of a) measuring the temperature at a first point on an elongate body extending into the fluid flow; b) measuring the temperature at a second point on the body, the second point being spaced apart from the first point; c) measuring the velocity of the fluid flow; and d) calculating the temperature of the fluid flow from the temperatures at the first and second points and the velocity of the flow, using a mathematical model of the heat transfer along a fin.

Also according to the invention there is provided an apparatus for determining the temperature of a fluid flow in a conduit. The apparatus comprises an elongate body for extending into the fluid flow; means for measuring the temperature at a first point on the elongate body; means for measuring the temperature at a second point on the elongate body, the second point being spaced apart from the first point; and processing means. The processing means calculates the temperature of the fluid flow from the temperatures at the first and second points and the velocity of the flow, using a mathematical model of the heat transfer along a fin, and provides an output representative of the temperature of the fluid flow.

The temperature sensing apparatus and the execution of the method are best described by reference to the principles and mathematical equations of heat transfer. In the equations, the following symbols are used:

| | |
|---|---|
| $\rho$ (rho) = | density (kg/m$^2$) |
| $\mu$ (mu) = | viscosity (kg/ms) |
| $\pi$ = | pi |
| d = | diameter of the elongate body / temperature probe (m) |
| $T_\infty$ = | temperature of the fluid flow / temperature to be measured (K) |
| $T_0$ = | temperature of the conduit wall / temperature at the base of the elongate body/temperature probe (K) |
| $T_1$ = | temperature near the tip of the elongate body/temperature probe (K) |
| e = | base of the natural logarithms |
| h = | convective heat transfer film coefficient (W/m$^2$K) |
| k = | thermal conductivity (Wm/K) |
| $k_F$ = | thermal conductivity of the fluid (Wm/K) |
| $k_p$ = | thermal conductivity of the temperature probe (Wm/K) |
| A = | area (m$^2$) |
| Pr = | Prandtl number |
| v = | velocity of the fluid flow (m/s) |
| Re = | $\rho v d/\mu$ = Reynolds number |
| x = | distance from the conduit wall to the temperature sensor measuring $T_1$ (m) |
| L = | length of the elongate body/temperature probe, measured from the conduit wall (m) |

Figure 1:
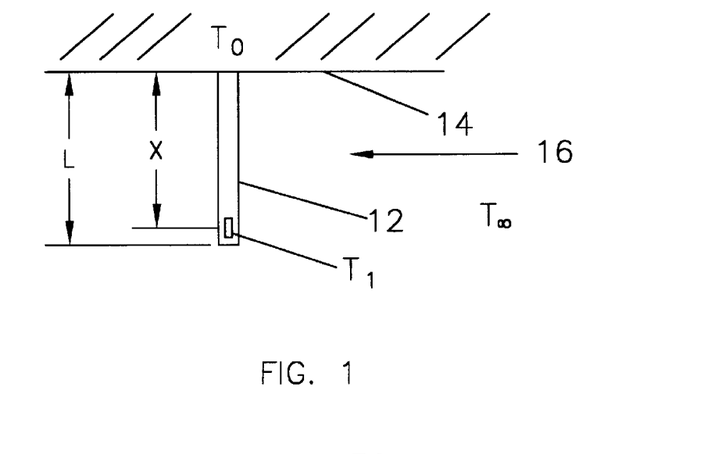
FIG. 1 is a schematic diagram of a temperature probe in accordance with the invention.

A temperature probe 12 according to the invention is shown in schematic form in FIG. 1. The temperature probe 12 is in the form of an elongate body which extends from a conduit wall 14 into a fluid flow 16. If the temperature $T_0$ of the conduit wall is different from the temperature $T_\infty$ of the fluid flow 16, heat will flow through the temperature probe 12 between the conduit wall 14 and the fluid flow 16.

For example, if the conduit wall 14 is hotter than the fluid flow 16, heat will flow conductively though the temperature probe 12 from the conduit wall 14, and pass convectively to the fluid flow 16 from the outer surface of the temperature probe 12. As heat is continually lost along the length of the temperature probe 12, the temperature along the probe 12 will vary in a predictable but complex fashion. In the case where the conduit wall 14 is hotter than the fluid flow 16, the temperature probe will have its hottest point at the conduit wall 16, and its temperature will decrease along the probe to a minimum at its tip.

The temperature $T_1$ at a point a distance x along a constant diameter temperature probe 12 having an overall length L can be determined by using Equation (1) below, which is the equation for the temperature distribution along a fin having an insulated tip:

$$\frac{T_1 - T_\infty}{T_0 - T_\infty} = \frac{e^{-mx}}{1 + e^{-2mL}} + \frac{e^{mx}}{1 + e^{2mL}} \qquad \text{Equation (1):}$$

If the diameter of the temperature probe is not constant, a relationship similar to Equation (1) can be used. However, the preferred and best mode embodiment of the invention employs a constant diameter temperature probe. Accordingly, the analysis will proceed using Equation (1).

In Equation (1), the term m is defined as follows:

$$m = \sqrt{\frac{h\pi d}{k_P A}} \quad \text{Equation (2):}$$

where h is the film coefficient of convective heat transfer from the temperature probe, d is the diameter of the temperature probe, $k_p$ is the coefficient of conductive heat transfer of the temperature probe, and A is the cross sectional area of the temperature probe. In practical terms, m is essentially a ratio of convective heat transfer from the temperature probe to conductive heat transfer along the probe.

In the best mode of the invention, the insulated tip equation is used since it yields a manageable mathematical solution, and as long as the ratio of the length of the temperature probe to its diameter remains large, the flow of heat from the tip is negligibly small.

For a temperature probe having a circular cross section, and for flows of gases or liquids having Reynolds numbers in the range of 4,000 to 40,000, the film coefficient of convective heat transfer, h, can be approximated as follows:

$$h = 0.193 \frac{k_F}{d} \left(\frac{\rho v d}{\mu}\right)^{0.618} Pr^{0.333} \quad \text{Equation (3):}$$

where $\rho$ is the density of the fluid flow, v is the velocity of the fluid flow, $\mu$ is the viscosity of the fluid, $k_F$ is the thermal conductivity of the fluid, and Pr is the Prandtl number. Seasoned fluid dynamicists will note that the central term in Equation (3) corresponds to Re, the Reynolds number, as follows:

$$Re = \left(\frac{\rho v d}{\mu}\right) \quad \text{Equation (4):}$$

Rearranging Equation (1) gives:

$$T_\infty = T_1 - (T_0 - T_\infty)\left(\frac{e^{-mx}}{1 + e^{-2mL}} + \frac{e^{mx}}{1 + e^{2mL}}\right) \quad \text{Equation (5)}$$

which in turn can be rearranged to become:

$$T_\infty = \frac{T_1 - T_0\left(\frac{e^{-mx}}{1 + e^{-2mL}} + \frac{e^{mx}}{1 + e^{2mL}}\right)}{1 - \left(\frac{e^{-mx}}{1 + e^{-2mL}} + \frac{e^{mx}}{1 + e^{2mL}}\right)} \quad \text{Equation (6)}$$

Substituting Equation (3) into Equation (2), gives:

$$m = \sqrt{\frac{0.193 \frac{k_F}{d}\left(\frac{\rho v d}{\mu}\right)^{0.618} Pr^{0.333} \pi d}{k_P A}} \quad \text{Equation (7)}$$

which can be simplified to:

$$m = \sqrt{C_1 Re^{0.618} Pr^{0.333} k_F} \quad \text{Equation (8)}$$

in which the constant and the parameters associated with the probe have been lumped together as $C_1$.

Therefore, to determine the temperature of the fluid flow $T_\infty$, in addition to measuring $T_0$ and $T_1$, it is necessary to determine the Prandtl number, the density $\rho$, viscosity $\mu$, thermal conductivity $k_F$, and the velocity v of the fluid flow.

In the case of most liquid flow applications, Pr, $\rho$, $\mu$, and $k_F$, can be determined using empirically derived equations which define the variation of these parameters with respect to the temperature of the liquid flow.

Such equations can easily be generated by applying curve fitting techniques to a series of data points obtained from existing tables of transport and thermodynamic properties.

In the case of a gas, Pr, $\mu$, and $k_F$ can be determined from the temperature of the gas, and the density $\rho$ can be determined using Boyle's law, or another equation of state, and the temperature and pressure of the fluid flow.

For a first determination of these parameters, $T_1$ is used in the empirically derived equations as an approximation of the temperature of the fluid flow $T_\infty$, and a pressure sensor is used to measure the fluid pressure.

The velocity of the fluid flow is determined using an appropriate flowmeter, which will also initially use $T_1$ as the temperature of the fluid flow if required.

These values can then be used in Equation (3) to determine h, all the other elements of the equation being predetermined constants for the particular probe. This value of h is then substituted into Equation (2) to determine m, which is then substituted into Equation (5) with the initial $T_\infty$ term on the right hand side of Equation (5) being approximated in the first calculation as $T_1$.

This initial solution of Equation (5) yields a first value of $T_\infty$, which, while a better measure of the temperature of the fluid flow than $T_1$, has inherent accuracies. These inherent accuracies result from the fact that $T_1$ was used as an approximation of $T_\infty$ to determine the initial fluid properties and velocities from which the first value of $T_\infty$ was calculated, and also because $T_1$ was used as an approximation of $T_\infty$ on the right hand side of Equation (5).

To reduce and ultimately remove these inaccuracies, this first value of $T_\infty$ is used in a second calculation on the right hand side of Equation (5), after updating the values of h and m and the other variables, to yield a second value of $T_\infty$. This iterative process continues indefinitely, and the error resulting from the use of $T_1$ in the initial calculation of Equation (5), and the errors resulting from the use of $T_1$ to determine initial fluid properties, are quickly removed.

Of course, while this iterative procedure is taking place, new measurements of $T_0$ and $T_1$ are continuously being taken, and these updated values used in Equation (5).

Alternatively, instead of using Equation (5) to solve for $T_\infty$, the value of m may be substituted into Equation (6) together with $T_1$ and $T_0$, to solve for $T_\infty$.

Again, this first value of $T_\infty$ will be used in a second iteration of the above procedure to determine the fluid properties, which will then be used to determine a new $T_\infty$. This iterative process will again continue and will remove errors in, and resulting from, the first calculated $T_\infty$, and to take into account any variation which takes place in the relevant temperatures and fluid properties.

In the course of the above two iterative processes, $T_\infty$ will be available as an output from the data processing means doing the calculations.

Other features of the present invention are disclosed or apparent in the section entitled: "BEST MODE FOR CARRYING OUT THE INVENTION."

BRIEF DESCRIPTION OF THE DRAWINGS

For fuller understanding of the present invention, reference is made to the accompanying drawings in the following detailed description of the Best Mode of Carrying Out the Present Invention. In the drawings.

BEST MODE FOR CARRYING OUT THE INVENTION

The best mode of the invention for putting the above principles and method into practice will now be described with reference to FIGS. 2 to 4.

As temperature sensors and data processors are both well-known in the art, in order to avoid confusion while enabling those skilled in the art to practice the claimed invention, this specification omits many details with respect to known items.

Figure 2:
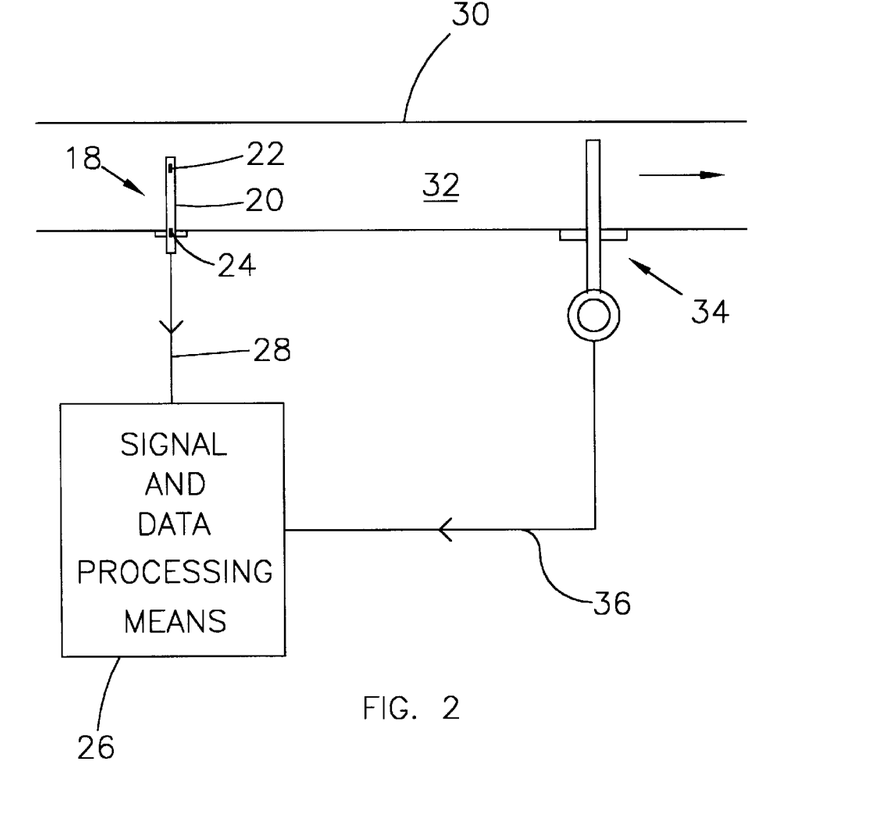
FIG. 2 is a schematic diagram of the best mode temperature sensing apparatus according to the invention.

Referring now to FIG. 2, a temperature sensing apparatus according to the invention is seen to comprise a temperature probe 18 and a signal and data processing means 26. The temperature probe 18 in turn comprises an elongate body 20, a first temperature sensor 22 and a second temperature sensor 24. The first and second temperature sensors 22, 24 are spaced apart along the length of the elongate body 20. The elongate body 20 is mounted to the wall of a conduit 30, and extends in use into a fluid flow 32 in the conduit 30.

First and second temperature signals from the first and second temperature sensors 22, 24 are passed to the signal and data processing means 26 by means of signal transmission lines 28.

The signal and data processing means 26 receives a signal which is representative of the velocity of the fluid flow 32 from a flowmeter 34, which is also mounted to the conduit 30. The velocity signal is passed from the flowmeter 34 to the signal and data processing means 26 via a signal transmission line 36. While the velocity signal is required for a determination of the temperature of the fluid flow 32 in accordance with the invention, it will be appreciated that in many industrial applications in which the invention can be utilized, a velocity signal is readily available from existing flowmeters. Accordingly, the flowmeter 34 itself is considered to be ancillary to the invention.

Also, while a true velocity (i.e. length per unit time) is used for the calculation of the temperature of the fluid flow in this embodiment of the invention, it will be appreciated that the flowmeter 34 may provide a signal which, while related to the velocity of the fluid low 32, is in fact not a true velocity signal, e.g. a mass flowrate or a volumetric flowrate signal. The phrase "representative of the velocity of the fluid flow" is to be interpreted accordingly. Such signals can be converted to a velocity in the signal and data processing means 26 using appropriate values of density, pipe diameter, etc.

There may also be circumstances where the velocity of the fluid flow is known, or can be estimated, by means other than its direct measurement. In such a case, the known or estimated value of the velocity may be used in place of the measured velocity. However, the accuracy of the determination of $T_\infty$ may deteriorate as a result of not using a measured value of the velocity.

In many cases, a signal representative of the pressure of the fluid flow is also available from the flowmeter 34. Alternatively, a separate pressure sensor could be provided if required, or an otherwise known or estimated value of the fluid pressure can be used.

In use, the temperature at a first point along the elongate body 20 is measured by the first temperature sensor 22, and the temperature at a second point along the elongate body 20 is measured by the second temperature sensor 24. A variable which is representative of the velocity of the fluid flow is measured by the flowmeter 34, and the appropriate signals are passed to the signal and data processing means 26 by means of signal transmission lines 28, 36. The actual temperature of the fluid flow is calculated in the signal and data processing means 26 from the first and second points and the variable representing the velocity of the flow, using a mathematical model of the heat transfer along a fin. The signal and data processing means 26 then provides an output representative of the temperature of the fluid flow.

Figure 3:
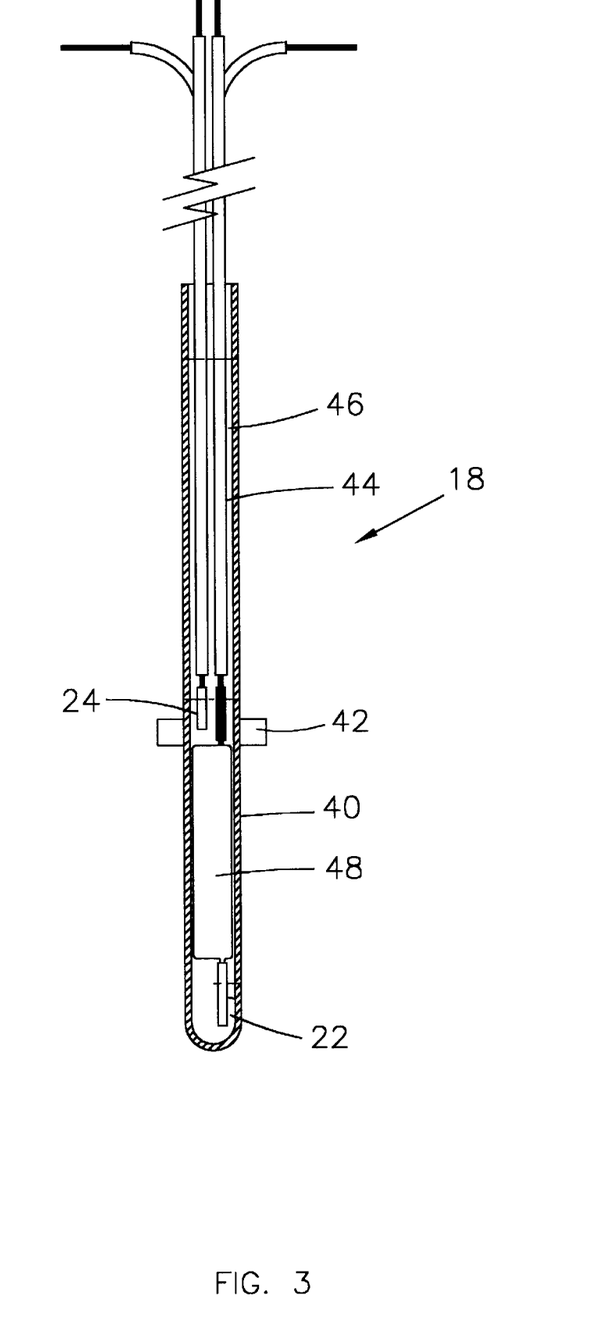
FIG. 3 is a longitudinal cross sectional view of the best mode temperature probe according to the invention.

The temperature probe 18 is illustrated in more detail in FIG. 3. The temperature sensors 22, 24 are mounted in a tubular sheath 40 of 316 stainless steel. The tubular sheath 40 is circular in cross section and has a flange 42 extending therefrom to enable the temperature probe to be mounted to the conduit 30, or to an appropriate mounting means which is adapted to be mounted to the conduit.

The temperature sensors 22, 24 in the best mode embodiment of the invention are 1000 Ω platinum thin film resistance temperature devices, but it will be appreciated that they may be any suitable temperature sensors.

Output signals are transmitted from the temperature sensors 22, 24 to the signal and data processing means 26 by means of fiberglass insulated platinum or nickel coated copper signal transmission wires 44. The signal transmission wires 44 are potted into the probe sheath 40 in an upper region 46 by means of alumina ceramic potting compound.

Below the flange 44, the signal transmission wires 44 for the temperature sensor 22 pass through a thermal insulator such as a glass mandrel 48. This is done to limit the heat conduction through the temperature probe 18.

Even though the invention provides a compensation for temperature measurement error resulting from heat flowing through a temperature probe, the final temperature output for the invention is more accurate if the error to be compensated for is as small as possible to begin with. By limiting the heat transfer through the temperature probe by providing the glass mandrel 48, the temperature $T_1$ measured by the first temperature sensor 22 will be closer to the actual flow temperature $T_\infty$, and hence the error to be compensated for is reduced.

Below the glass mandrel 48, the temperature sensor 22 is again potted into the probe sheath 40 by means of alumina ceramic potting compound.

In use, the temperature sensor 24 coincides with the wall of the conduit 30, and it is thus only necessary to determine the heat transfer constants for the temperature probe 18 from below the temperature sensor 24 to the tip of the temperature probe 18.

For the temperature probe 18 illustrated in FIG. 3, the parameter $K_p A$ for use in Equations (2) and (7) can be determined as follows:

For the probe sheath 40,

| | For the probe sheath 40, |
|---|---|
| $K_{316SS}$ = | 18.9 W/mK |
| $A_{316SS}$ = | $\pi(0.125 \times 0.0254)^2/4 - \pi(0.105 \times 0.0254)^2/4$ = 0.0000023m$^2$ |
| $KA_{316SS}$ = | 0.000044 Wm/K |
| | For the platinum signal transmission wires 44, |
| $K_{PT}$ = | 72 W/mK |
| $A_{PT}$ = | $(2)\pi(0.010 \times 0.0254)^2/4$ = 0.0000001m$^2$ |
| $KA_{PT}$ = | 0.0000072 Wm/K |
| | For the glass mandrel, |
| $K_{GLASS}$ = | 1.6 W/mK |
| $A_{GLASS}$ = | $\pi(0.0105 \times 0.0254)^2/4$ = 0.00000055m$^2$ |

-continued

Figure 4:
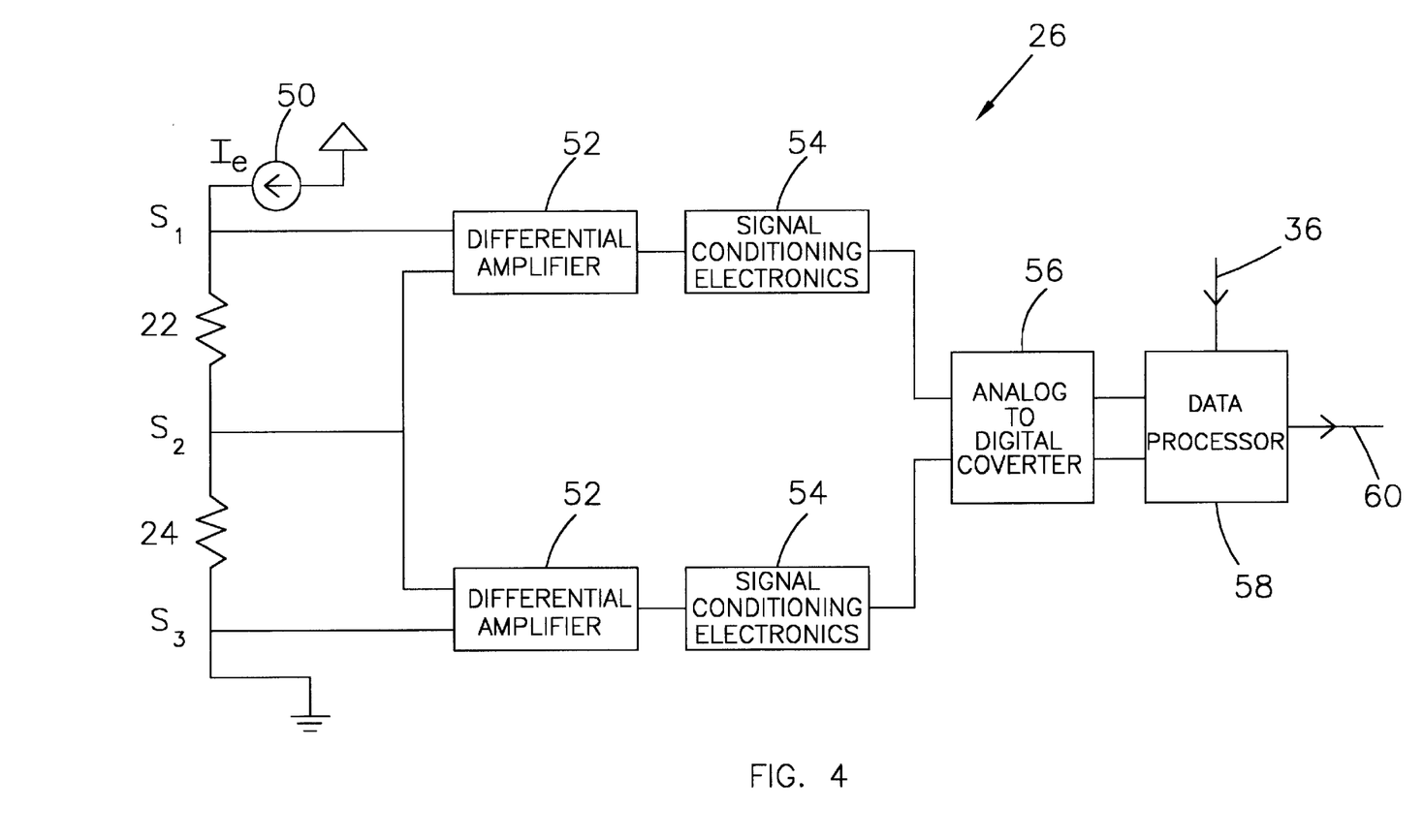
FIG. 4 is a schematic diagram of the best mode signal and data processing means of the invention.

KA$_{GLASS}$ = 0.0000008 Wm/K (insignificant)
From the electrical resistance analogy for heat flow paths, KA$_{PROBE}$ = KA$_{316SS}$ + KA$_{PT}$ + KA$_{AIR}$ = 0.0000513 Wm/K The signal and data processing means 26 is shown in more detail in schematic form in FIG. 4. The signal and data processing means 26 comprises an electrical current source 50, two high impedance differential amplifiers 52, two signal conditioning units 54, a multi-channel analog to digital (A/D) converter 56, and a data processor 58.

The resistance temperature device (RTD) temperature sensors 22, 24 are wired in parallel as shown, in a four wire current excitation configuration. This configuration reduces the wiring and circuitry required, since only five wires are needed to interconnect the four wires of each temperature sensor.

The current source 50 provides a current $I_E$ which is used to excite the temperature sensors 22, 24. The voltages at the junctions S1, S2 and S3 are measured by the differential amplifiers 52. This measurement draws very little current, reducing errors which might otherwise be introduced into the operation of the temperature probe 18.

Once the voltages across the temperature sensors 22,24 have been determined, the resistances of the temperature sensors can be determined in the data processor using Ohm's law (V=IR), $I_E$ being known.

The voltages from the differential amplifiers 52 are passed to the signal conditioning electronics units 54. The signal conditioning units 54 set the zero and full scale of the voltages to ensure that a useful measurement with sufficient resolution can be made by the A/D converter 56.

The A/D converter 56 converts the analog voltage signal received from the signal conditioning units 54 into digital outputs suitable for use by the data processor 58.

The data processor 58, which receives a velocity signal from the flowmeter 34 as well as the inputs from the A/D converter 56, then executes the method described below to yield an output of the flow temperature $T_\infty$.

The data processor 58 comprises a dedicated industrial microcontroller manufactured by Philips, unit no BOC31. The flow temperature output from this unit is available as a readout on a display, or as an industry standard 4 to 20 mA analog signal, or as a digital RS 485 output.

In use, the temperature probe 18 is inserted into a flow stream, in this example an air flow, and the signal and data processing means 26 executes the following method to determine the fluid flow temperature.

For the method, the following constants and variables are used:

| | |
|---|---|
| TW = | Temperature of pipe wall (temperature sensor 24) (K) |
| TT = | Temperature of tip of probe 18 (temperature sensor 22) (K) |
| RTW = | Resistance of temperature sensor 24 (Ω) |
| RTT = | Resistance of temperature sensor 22 (Ω) |
| TINF = | Temperature of the gas flow (K) |
| D = | Diameter of temperature probe 18 (m) |
| L = | Length of temperature probe (m) |
| PS = | Standard pressure (psia) |
| PA = | Actual pressure (psia) |
| X = | Location of temperature sensor 22 along probe 18 (m) |
| ROS = | Standard density of the gas at 273.15 K and 1 atmosphere (kg/m$^3$) |
| ROA = | Actual density of the gas (kg/m$^3$) |

-continued

| | |
|---|---|
| MU = | Viscosity of the gas (kg/ms) |
| KGAS = | Conduction coefficient for the gas (w/mK) |
| PI = | π |
| PR = | Prandtl number of the gas (dimensionless) |
| KASENS = | Composite conduction coefficient for probe 18 (wm/°K.) |
| U = | Optional temporary variable |
| V = | Gas velocity (m/s) |
| H = | Film coefficient of heat transfer due to forced convection (W/m$^2$K) |
| G = | Gas type |
| TINFNEW = | Updated value of TINF after performing method |

The data processor then executes the method as follows:

"Read Constants for this Probe"

10    D = .0032 m
20    L = .0178 m
30    X = .0140 m
40    KASENS = .0000513 wm/K
"Read Gas Type"

50    G = AIR
60    EXECUTE [subroutine to initialize constants for particular gas, i.e.PS, ROS]
"Read temperature sensor resistances and use manufacture provided data to determine temperatures"

65    INPUT RTW
70    INPUT RTT
75    TW = [Manufacturer provided calibration constants in Callender-Van Dusen equation, fn(RTW)]
80    TT = manufacturer provided calibration constants in Callender-Van Dusen equation, fn(RTT)]
"Set up initial value for TINF"

90    TINF = TT
"Determine values of various required parameters"

100   ROA = ROS*(PA/Ps)*(273.15/TINF) [Boyle's law]
110   INPUT V = (Actual velocity, from flowmeter 34)
120   KGAS = 1.E-7 * TINF^0.856 [Empirically derived equation]
130   MU = 2.374E-7 * TINF^0.763 [Empirically derived equation]
140   PR = 1.058 * TINF^(-0.0684) [Empirically derived equation]
"Calculate convective heat transfer coefficient using Equation (3)"

150   H = 0.193*(KGAS/D)*((ROA*V*D)/(MU))^0.618*(PR)^0.333
"Calculate m using Equation (2)"

160   M = ((H*PI*D)/(KASENS))^0.5
"Calculate TINFNEW using Equation (6)"

165   U = e^(-M*X)/(1 + e^(-2*M*L)) + (e^(M*X)/(1 + e^(2*M*L))
170   TINFNEW = (TT - TW*U)/(1-U)
180   TINF = TINFNEW
"Re-execute procedure with the new value of TINF"

190   GOTO 100

Alternatively, step 170 above could be replaced by the calculation of TINFNEW using Equation (5) as follows:

170 *TINFNEW=TT−(TW−TINF)*U*

The calculation of TINF using Equation (6) is however the best mode of the invention, since a previously calculated TINF is not found on the right hand side of this equation.

After $T_\infty$ is first calculated, the signal and data processing means 26 provides an output of $T_\infty$, which is then available for in process control equipment, or for whatever other reason it was desired to measure the temperature in the first place.

The above method may be stored in the form of computer executable instructions embodied on a computer readable media, such as a removable or fixed computer disk or diskette, or a CD-ROM disk.

In an alternative embodiment of the invention, the temperature probe is included in an integrated sensor device which provides an output of fluid temperature, pressure and velocity or mass flowrate. In the best mode embodiment of such an integrated sensor device, the temperature probe 18 is included as the temperature sensor 31 in the vortex flowmeter described in pending US patent application Ser. No. 08/757,464, filed on Nov. 27, 1996 entitled "Vortex flowmeter including cantilevered vortex and vibration sensing beams", attorney's docket no. P673, the entire disclosure of which is incorporated herein by reference as if explicitly set forth herein.

It will be appreciated that the invention is not limited to the embodiment of the invention described above, and many modifications are possible without departing from the spirit and the scope of the invention.

For example, while temperature sensor 24 coincides with the wall of the conduit 30, it could be positioned elsewhere on the temperature probe 12, at a location spaced apart from the temperature sensor 22, with appropriate modifications to the heat transfer model.

Similarly, while the preferred position for temperature sensor 22 is at the tip of the temperature probe 12, it could be located further up the temperature probe 12.

Further, the temperature sensor 24 may be located in the wall of the conduit rather than in the probe 12 itself. In such a case, the temperature sensor 24 will still provide an output of the temperature at the base of the probe 12.

Also, while the heat transfer equations which were used were for a fin with an insulated tip, other heat transfer models could be used in the calculation of $T_\infty$.

What is claimed is:

1. Apparatus for determining the temperature of a fluid, comprising:

an elongate body for extending into the fluid;

means for measuring the fluid temperatures measured at the first and second locations a fluid temperature at a first location on the elongate body;

means for measuring a fluid temperature at a second location on the elongate body, the second location being spaced apart from the first location; and processing means for determining the temperature of the fluid from the fluid temperatures measured at the first and second locations and values of one or more fluid properties, the fluid properties being properties other than temperature, the processing means in use determining the temperature of the fluid using a mathematical model for the heat transfer along the elongate body.

2. Apparatus according to claim 1 wherein the processing means in use determines the temperature of the fluid from the fluid temperatures at the first an second locations and a value which is representative of fluid velocity, and a mathematical model of the heat transfer along a fin.

3. Apparatus according to claim 2 wherein the first location is at a tip of the elongate body and the processing means in use determines initial values for one or more of the fluid properties using the fluid temperature at the first location.

4. Apparatus according to claim 3 wherein the processing means in use determines subsequent values for one or more of the fluid properties using a determined temperature of the fluid.

5. Apparatus according to claim 4 wherein the value of at least one of the fluid properties is determined from an empirically derived equation for the variation of said property with respect to temperature.

6. Apparatus according to claim 1 wherein the processing means in use determines the temperature of the fluid from the fluid temperatures at the first and second locations and a value which is representative of fluid velocity, and a mathematical model of the heat transfer along a fin having an insulated tip.

7. Apparatus according to claim 6 wherein the processing means determines the temperature of the fluid repeatedly in an iterative loop using a value of the fluid temperature determined in a previous loop to determine updated values of fluid properties.

8. Apparatus for determining the temperature of a fluid, comprising:

an elongate element for extending into the fluid;

a first temperature sensor mounted in the elongate element;

a second temperature sensor which is positioned to sense a fluid temperature at a location on the elongate element, the location being spaced apart from the first temperature sensor along the length of the elongate element the first and second sensors generating respective first and second temperature signals; and processing means for receiving first and second temperature signals from the first and second temperature sensors respectively, the processing means in use determining the temperature of the fluid from the first and second temperature signals and values of one or more fluid properties using a mathematical model of the heat transfer along the elongate element, the processing means further for providing an output of the temperature of the fluid flow the fluid properties being properties other than temperature.

9. Apparatus according to claim 8 wherein the processing means in use determines the temperature of the fluid from the first and second temperature signals and a value which is representative of fluid velocity, and a mathematical model of the heat transfer along a fin.

10. Apparatus according to claim 8 wherein the first temperature sensor is located at a tip of the elongate element and the processing means in use determines initial values for the fluid properties using the first temperature signal.

11. Apparatus according to claim 10 wherein the processing means in use determines subsequent values for one or more of the fluid properties using a determined temperature of the fluid flow.

12. Apparatus according to claim 11 wherein the value of one or more of the fluid properties is determined from an empirically derived equation for the variation of said property with respect to fluid temperature.

13. Apparatus according to claim 9 wherein the processing means in use determines the temperature of the fluid using an equation for the temperature distribution along a fin having an insulated tip.

14. Apparatus according to claim 13 wherein the processing means determines the temperature of the fluid repeatedly in an iterative loop using the value of the fluid temperature determined in a previous loop to determine updated values of one or more of the fluid properties.

15. A method of determining the temperature of a fluid using an elongate element extending into the fluid flow, the elongate element including a body and first and second temperature sensors, the first temperature sensor being spaced apart from the second temperature sensor along the length of the elongate element, said method comprising:

obtaining a first temperature signal from the first temperature sensor;

obtaining a second temperature signal from the second temperature sensor;

providing the first temperature signal and the second temperature signal to processing means;

determining the fluid temperature in the processing means using a mathematical model of the heat transfer along the elongate body, the first and second temperature signals and values for one or more fluid properties the fluid properties being properties other than temperature; and providing an output signal from the processing means, the output signal being representative of the fluid temperature.

16. A method according to claim 15 further comprising the steps of:

obtaining a velocity signal which is representative of the velocity of the fluid flow; and providing the velocity signal to the processing means, and wherein, in the determining step, the temperature of the fluid is determined from temperatures measured at the first and second locations and the velocity signal, and a mathematical model of the heat transfer along a fin.

17. A method according to claim 16 wherein the fluid temperature is determined repeatedly in an iterative loop, and initial values for one or more of the fluid properties are determined using the first temperature signal.

18. A method according to claim 17 wherein subsequent values for one or more of fluid properties are determined using a temperature of the fluid determined in a previous iterative loop.

19. A method according to claim 15 wherein the value of at least one of the fluid properties is determined from an empirically derived equation for the variation of said property with respect to fluid temperature.

20. A method according to claim 16 wherein the determination of the fluid temperature is performed using an equation for the temperature distribution along a fin having an insulated tip and a velocity signal which is representative of the velocity of the fluid flow.

21. Method according to claim 20 wherein the processing means determines the temperature of the fluid repeatedly in an iterative loop using the value of the fluid temperature determined in a previous loop to determine updated values of one or more of the fluid properties.

22. Apparatus for determining the temperature of a fluid flow in a conduit, comprising:

an elongate body for extending into the fluid flow;

means for measuring a fluid temperature at a first location on the elongate body;

means for measuring a fluid temperature at a second location on the elongate body, the second location being spaced apart from the first location; and processing means for determining the temperature of the fluid flow from the fluid temperatures measured at the first and second locations and the velocity of the fluid flow, the processing means in use determining the temperature of the fluid flow using a mathematical model for the heat transfer along a fin.

23. Apparatus according to claim 22 wherein the first location is at a tip of the elongate body and the processing means in use determines initial values for properties of the fluid flow using the temperature measured at the first location the fluid properties being properties other than temperature.

24. Apparatus according to claim 23 wherein the processing means in use determines subsequent values for the properties of the fluid flow using a determined temperature of the fluid flow.

25. Apparatus according to claim 24 wherein the value of at least one of the properties of the fluid flow is determined from an empirically derived equation for the variation of the property with respect to temperature.

26. Apparatus according to claim 22 wherein the processing means in use determines the temperature of the fluid flow using an equation for the temperature distribution along a fin having an insulated tip.

27. Apparatus according to claim 26 wherein the processing means determines the temperature of the fluid flow repeatedly in an iterative loop using the value of the fluid temperature determined in a previous loop to determine updated values of fluid properties.

28. Apparatus for determining the temperature of a fluid flow in a conduit, comprising:

an elongate element for extending into the fluid flow;

a first temperature sensor mounted in the elongate element;

a second temperature sensor which is positioned to sense a fluid temperature at a location on the elongate element, the location being spaced apart from the first temperature sensor along the length of the elongate element; and processing means for receiving first and second temperature signals from the first and second temperature sensors respectively, and for receiving a velocity signal representative of the velocity of the fluid flow, the processing means in use determining the temperature of the fluid flow from the first and second temperature signals and the velocity signal using a mathematical model of the heat transfer along a fin, the processing means further for providing an output of the temperature of the fluid flow.

29. Apparatus according to claim 28 wherein the first temperature sensor is located at a tip of the elongate element and the processing means in use determines initial values for the properties of the fluid flow using the first temperature signal.

30. Apparatus according to claim 29 wherein the processing means in use determines subsequent values for the properties of the fluid flow using a determined temperature of the fluid flow.

31. Apparatus according to claim 30 wherein the value of at least one of the properties of the fluid flow is determined from an empirically derived equation for the variation of the property with respect to fluid temperature.

32. Apparatus according to claim 28 wherein the processing means in use determines the temperature of the fluid flow using an equation for the temperature distribution along a fin having an insulated tip.

33. Apparatus according to claim 32 wherein the processing means determines the temperature of the fluid flow repeatedly in an iterative loop using the value of the fluid temperature determined in a previous loop to determine updated values of fluid properties.

34. A method of determining the temperature of a fluid flow using an elongate element extending into the fluid flow, the elongate element including a body and first and second temperature sensors, the first temperature sensor being spaced apart from the second temperature sensor along the length of the elongate element, said method comprising:

obtaining a first temperature signal from the first temperature sensor;

obtaining a second temperature signal from the second temperature sensor;

obtaining a velocity signal representative of the velocity of the fluid flow;

providing the first temperature signal, the second temperature signal, and the velocity signal to processing means;

determining the fluid flow temperature in the processing means using a mathematical model of the heat transfer along a fin, the first and second temperature signals and the velocity signal; and providing an output signal from the processing means, the output signal being representative of the temperature of the fluid flow.

35. A method according to claim 34 wherein the fluid flow temperature is determined repeatedly in an iterative loop, and initial values for the properties of the fluid flow are determined using the first temperature signal the properties of the fluid flow being properties other than temperature.

36. A method according to claim 35 wherein subsequent values for the properties of the fluid flow are determined using the temperature of the fluid flow determined in a previous iterative loop.

37. A method according to claim 36 wherein the value of at least one of the properties of the fluid flow is determined from an empirically derived equation for the variation of the property with respect to fluid temperature.

38. A method according to claim 34 wherein the determination of the fluid flow temperature is performed using an equation for the temperature distribution along a fin having an insulated tip.

39. A method according to claim 38 wherein the processing means determines the temperature of the fluid flow repeatedly in an iterative loop using the value of the fluid temperature determined in a previous loop to determine updated values of fluid properties.

* * * * *

UNITED STATES PATENT AND TRADEMARK OFFICE
CERTIFICATE OF CORRECTION

PATENT NO : 5,879,082
DATED : MAR. 9, 1999
INVENTOR(S): John P. Smitherman, John G. Olin It is certified that error appears in the above-identified patent and that said Letters Patent is hereby corrected as shown below:

Column 9, lines 36 and 37, beginning after the word "measuring", delete[the fluid temperatures measured at the first and second locations].

Signed and Sealed this

Thirtieth Day of November, 1999

Attest:

Q. TODD DICKINSON

Attesting Officer

Acting Commissioner of Patents and Trademarks